United States Patent Office 3,379,763
Patented Apr. 23, 1968

3,379,763
PREPARATION OF PRIMARY AND SECONDARY AMINES FROM ALKYL SULFATES
Sydney H. Shapiro, Chicago, Ill., assignor to Armour and Company, Chicago, Ill., a corporation of Delaware
No Drawing. Filed Sept. 1, 1964, Ser. No. 393,749
2 Claims. (Cl. 260—583)

ABSTRACT OF THE DISCLOSURE

An alkyl sulfate, in which the hydrocarbon radical has from 6–22 carbon atoms, is reacted directly and under pressure with ammonia or a primary amine in the presence of a strong base and at a temperature of about 150–250° C. to prepare primary and secondary amines.

This invention relates to the preparation of primary and secondary amines from alkyl sulfates.

An object of the invention is to provide a novel process for the production of primary and secondary amines from alkyl sulfates. A further object is to provide a process for the preparation of amines in which alkyl sulfates in the presence of a strong base are reacted with ammonia or a primary amine in a pressure operation to obtain a high yield of primary or secondary amines. Other specific objects and advantages will appear as the specification proceeds.

In one embodiment of the invention, alkyl sulfates in which the hydrocarbon radical has from 6 to 22 carbon atoms are reacted with ammonia or a primary amine in a closed system at autogenetic pressures and at a temperature range of from about 150° to 250° C. The alkyl sulfates may be derived from olefins which are sulfonated and then neutralized. For example, sodium and potassium alkyl sulfates may be employed, and the hydrocarbon radical may have from 6 to 22 carbon atoms.

The following equation is representative of the general reaction:

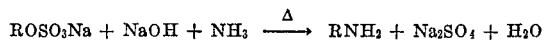

$$ROSO_3Na + NaOH + NH_3 \xrightarrow{\Delta} RNH_2 + Na_2SO_4 + H_2O$$

In the above equation, R indicates a higher or long chain alkyl radical which, as above stated, contains from 6 to 22 carbon atoms.

Any suitable base may be employed. I prefer, however, to employ a strong base, such as NaOH and KOH.

In the above representative equation, the addition of the ammonia to the alkyl sulfate in the presence of sodium hydroxide produces a primary amine. By substituting a primary amine for the ammonia, the product is a secondary amine.

Alternatively, an unsaturated amine can be sulfonated with sulfuric acid to form the sulfate amine derivative which can be subjected to the above equation mechanism to yield a product such as 1,9 or 1,10 diamine.

In the preferred procedure for preparing the primary amine, the reaction may be illustrated by the following equation:

Preparation of primary amines:

(1) $ROSO_2OH + 2NaOH + NH_3 \rightarrow$
$$RNH_2 + 2H_2O + Na_2SO_4$$

R=any alkyl radical.

In the preparation of the secondary amine, the process is described in the following equation:

Preparation of secondary amines:

(2) $ROSO_2OH + 2NaOH + R'NH_2 \rightarrow$
$$RNHR' + 2H_2O + Na_2SO_4$$

R, R'=any alkyl radical.

In the preparation of primary amines via the above-described mechanism, one problem is to limit the formation of secondary and tertiary amines. In order to obtain high selectivity, I prefer to increase the ammonia to alkyl sulfate ratio and also to increase the temperature. For example, the ammonia to sulfate ratio may be increased to about 10:1, and the temperature may be in the range of 150° to 250° C. I prefer to employ a temperature in excess of about 200° C.

In the preparation of the secondary amines, the same range of temperatures may be employed, the preferred temperature being in the range of 150° to 200° C. The pressure for manufacture is the autogenetic pressure of the system, which is preferably between 200 and 500 pounds per square inch, the reaction time being about 4 to 8 hours.

Specific examples illustrative of the process may be set out as follows:

Example I

The following tests were carried out with the results described below, in which g. indicates a gram, N.E. indicates neutral equivalent, and mol. wt. indicates molecular weight.

A one-liter Magnedash was charged with:

| | |
|---|---|
| $NH_3$ saturated water (4+ moles) _____g__ | 100 |
| Sodium lauryl sulfate (0.5 mole) _____g__ | 150 |
| Sodium hydroxide pellets (0.5 mole) _____g__ | 20 |
| Dow antifoam _____cc__ | 1 |

5 hrs. at 140–150° C. _____ 200 p.s.i. gave N.E. 2180.
2 additional hrs. at 200° C. _____ 440 p.s.i. gave N.E. 287.
3 additional hrs. at 200° C. _____ 440 p.s.i. gave N.E. 283.

The samples and total batch were poured into hot water giving two layers, and extracted with Skelly B, and the solvent evaporated. The yield was essentially quantitative (94 g.). Standard primary, secondary and tertiary amine analysis of the crude gave the following:

| | Percent Amine | Mol. Wt. |
|---|---|---|
| 2.49 meq./g. primary amine_____ | 48.5 | 195 |
| 0.89 meq./g. secondary amine_____ | 33.2 | 373 |
| 0.14 meq./g. tertiary amine_____ | 7.7 | 551 |
| | 89.4 | |

Seventy-eight grams of this crude was distilled at 1.0–1.5 mm. reduced pressure without fractionation; the pot temperature range was 130° to 340° C. and the head 85° to 240° C., yielding 67 g. (86%) of a white semi-solid distillate and an 8 g. residue (10.4%). The distillate analysis was:

| | Percent Amine | Mol. Wt. |
|---|---|---|
| 2.88 meq./g. primary_____ | 56.1 | 195 |
| 0.91 meq./g. secondary_____ | 34.0 | 373 |
| 0.16 meq./g. tertiary_____ | 8.8 | 551 |
| | 98.9 | |

In the foregoing example, the feed material was lauryl sulfate. The product was analyzed for chain length by gas chromatographic analysis after conversion to the dimethyl amine derivative, and the following analysis was obtained:

| Carbon chain length | Percent |
|---|---|
| 8 | 9.3 |
| 10 | 3.2 |
| 12 | 45.2 |
| 14 | 29.9 |
| 16 | 12.1 |

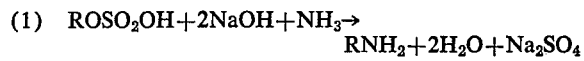

Example II

The process is carried out as described in Example I except that monomethyl amine is substituted for ammonia and the product is a secondary amine, methyl lauryl amine.

Example III

The process is carried out as described in Example I except that potassium lauryl sulfate is substituted for sodium lauryl sulfate, the results being comparable.

Example IV

Comparable results are also obtained when the process is carried out as described in Example I using KOH instead of NaOH.

While in the foregoing specification, I have set forth specific processes in considerable detail for the purpose of illustrating embodiments of the invention, it will be understood that such details may be varied widely by those skilled in the art without departing from the spirit of my invention.

I claim:
1. In a process for the preparation of amines, the step of heating in a closed system under pressure an alkyl sulfate, in which the alkyl radical has from 6-22 carbon atoms, with a reagent selected from the group consisting of ammonia and a primary lower alkyl amine in the presence of a strong base and at a temperature of about 150-250° C.
2. The process of claim 1 in which the alkyl sulfate has in its hydrocarbon radical from 10-22 carbon atoms.

References Cited

UNITED STATES PATENTS 2,364,178 12/1944 Wilson _____ 260—585 X
2,618,659 11/1952 Wright et al. _____ 260—585 X CHARLES B. PARKER, *Primary Examiner.*

R. L. RAYMOND, *Assistant Examiner.*